United States Patent [19]

Watanabe

[11] Patent Number: 4,603,953

[45] Date of Patent: Aug. 5, 1986

[54] FLASH DEVICE

[75] Inventor: Isao Watanabe, Kanagawa, Japan

[73] Assignee: Canon Kabushiki Kaisha, Tokyo, Japan

[21] Appl. No.: 590,065

[22] Filed: Mar. 15, 1984

[30] Foreign Application Priority Data

Mar. 28, 1983 [JP] Japan .............................. 58-44688[U]

[51] Int. Cl.$^4$ ............................................ G03B 15/05
[52] U.S. Cl. ......................................... 354/126; 362/3
[58] Field of Search ................... 354/126, 145.1, 149.1, 354/149.11, 64, 127.1–127.13; 362/3, 8–10, 5

[56] References Cited

U.S. PATENT DOCUMENTS 4,166,680 9/1979 Maitani ................................ 354/126
4,512,644 4/1985 Yoshida ........................... 354/149.1

FOREIGN PATENT DOCUMENTS 56-87029 7/1981 Japan ................................... 354/126

56-101133 8/1981 Japan ..................................... 362/3

*Primary Examiner*—Michael L. Gellner
*Attorney, Agent, or Firm*—Toren, McGeady, Stanger, Goldberg & Kiel

[57] ABSTRACT

In a flash device having the body part thereof arranged to be turnable relative to a fixed or stationary part which includes a mounting part for mounting the flash device on a camera so that the body part can be uplifted when the flash device is to be used and can be bent down toward the lens barrel of the camera for improved portability when the flash device is not in use, an operation member is disposed on the fixed part in such a position as to be covered by the body part when the body part is shifted to a usable position or to an unusable position thereof so that water, etc. can be prevented from entering the inside of the flash device via the operation member while the flash device is used or not used in the rain.

2 Claims, 5 Drawing Figures

FLASH DEVICE

BACKGROUND OF THE INVENTION

1. Field of the Invention

This invention relates to a flash device of the clip-on type arranged to be used by mounting it on an accessory shoe of a camera.

2. Description of the Prior Art

The flash device of the clip-on type tend to become larger in size accordingly as their specifications are diversified. As a result, with a flash device mounted on a camera, the system consisting of the camera and the flash device tends to have a center of gravity thereof located at a considerably high point. This results in an unstable state of the system and then the camera cannot be freely carried with the flash device left mounted thereon. To solve this problem a flash device has been proposed in Japanese Laid-Open Utility Model Application No. SHO 57-98436. In this flash device, a movable part (a flash device body) containing a light emitting part is arranged to be movable relative to a fixed or stationary part including a mounting foot. The flash device body is thus turnable on a part close to the mounting foot. The flash device body is uplifted when the flash device is to be used and is bent down for improved portability to a position where it is parallel to the fixed part.

Meanwhile, in the conventional flash device an operation member such as a power supply switch operation knob or the like is disposed on the casing of the flash device body. Therefore, when the flash device is used in the rain, rain water hits the flash device directly on the operation part and thus tends to enter the inside of the casing of the flash device via the operation part.

SUMMARY OF THE INVENTION

This invention is directed to the solution of the above-stated problem of the prior art. It is therefore an object of the invention to provide a flash device which is of the clip-on type having a movable part including a light emitting part and a fixed or stationary part formed in one unified body with a mounting foot part with a curved surface formed in the fixed part to have the movable part turnably engaged therewith, and which is arranged not only to improve the portability of the flash device but also to prevent water from intruding during the use of the flash device. To attain this object, in the flash device according to the invention, the operation member thereof is arranged in a part of the curved surface of the fixed part to be covered by the casing of the movable part when the movable part is shifted to a predetermined position relative to the fixed part (or when the flash device body is uplifted on the fixed part). In accordance with the invention, the operation part of the flash deivce is thus arranged to be protected with the movable part by utilizing the portability improving arrangement thereof.

The above and further objects and features of the invention will become apparent from the following detailed description of the preferred embodiment thereof taken in conjunction with the accompanying drawings.

DESCRIPTION OF THE PREFERRED EMBODIMENT

Figure 1:
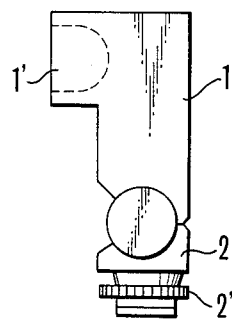
FIG. 1 is a side view showing the arrangement of a flash device according to the present invention.
Figure 2:
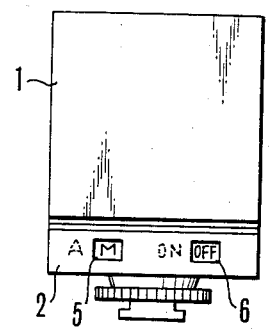
FIG. 2 is a rear elevation showing the flash device of FIG. 1.
Figure 3:
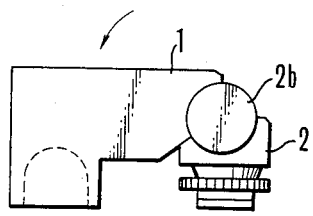
FIG. 3 is a side view showing the flash device of FIG. 1 as in an unusable state.
Figure 4:
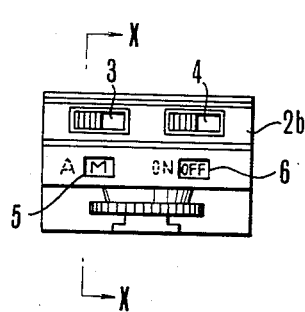
FIG. 4 is a rear view of the flash device shown in FIG. 3.
Figure 5:
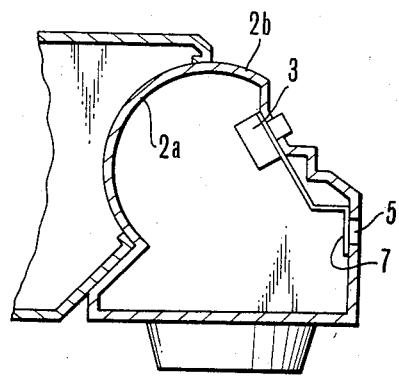
FIG. 5 is a sectional view taken on line X—X of FIG. 4.

Referring to FIG. 1 which is a side view of a flash device according to the present invention, the device includes a movable part 1 containing therein a light emitting part 1' and a fixed or stationary part 2 which is provided with a foot part 2' for mounting the flash device on a camera. The moveable part 1 and the fixed part 2 are engaged with each other, for example, by a groove provided in the round surface 2a of the casing of the fixed part 2 (see FIG. 5). The movable part 1 is thus arranged to be turnable over the round surface of the fixed part 2. The rear side of the flash device of FIG. 1 is arranged as shown in FIG. 2. On the rear side of the flash device are provided indicating window parts 5 and 6 which are located on the fixed part and are made from a transparent material. Referring again to FIG. 5, an operation knob 3 for a mode selection switch is arranged within the fixed part 2. An indication plate 7 which is arranged to move with the knob 3 is disposed at the above-stated indicating window parts. FIG. 3 shows the above-stated movable part as in a state of having been turned in the direction of arrow relative to the fixed part. Under this condition, an operation surface 2b of the casing of the fixed part 2 is released from a state of being covered by the casing of the movable part 1 and is exposed to the outside. On this operation surface 2b are arranged operation members such as the mode selection switch operation knob 3 and a power supply switch operation knob 4.

With the foot part 2' of the flash device attached to the camera, when the movable part 1 is bent down as shown in FIG. 3, the flash device comes closer to the lens barrel of the camera (not shown). This permits the camera to be stably carried with the flash device kept mounted thereon. Under this condition, the knobs 3 and 4 can be operated because they are exposed to the outside as mentioned above. In carrying out a flash photographing operation, therefore, the knobs 3 and 4 are operated and, after that, the movable part 1 is turned in the direction reverse to the direction of arrow to direct the light emitting part 1' towards an object to be photographed. The flash device thus becomes ready for operation.

With the flash device thus brought into a usable state, the operation surface 2b of the fixed part is covered by the rear side of the casing of the movable part 1 as mentioned above and as shown in FIG. 2. This effectively prevents these operation knobs from being inadvertently moved to unintentionally turn off the power supply or to unintentionally shift the operation mode of the flash device, for example, from an automatic operation mode to a manual operation mode.

In this specific embodiment, the operation member is disposed on the rear side of the fixed part. However, the operation part may be disposed on the front side of the fixed part. In that instance, the operation part is covered by the movable part when the flash device is in an unusable position and is uncovered when the flash device is in a usable position.

In accordance with the present invention, as described in the foregoing, the operation part can be covered with the movable part as the former is disposed on the curved or round surface of the fixed part. Therefore, the problems such as intrusion of water, etc. can be solved by utilizing the above-stated structural arrangement contrived to improve the portability of the camera system.

While a specific embodiment of the invention has been shown and described in detail to illustrate the application of the inventive principles, it will be understood that the invention may be embodied otherwise without departing from such principles.

What I claim:

1. A flash device which can be mounted on an accessory shoe part of a camera body, comprising:
   (a) a mounting part for mounting said flash device on said accessory shoe part of the camera body;
   (b) a stationary part formed integrally with said mounting part, wherein a display part is arranged at a first position close to said mounting part of the stationary part and an operation member of the flash device is arranged at a second position which is spaced away from the mounting part a greater distance than the first position; and
   (c) a body part turnably connected to said stationary part, wherein a light emitting part is provided at said body part, said body part being turnable from a usable position to an unusable position relative to the stationary part and having an end portion of the body part located at a position which is higher than the first position and which is positionable to cover the second position when the body part is at a usable position relative to the stationary part, said end portion of the body part being shifted to a position higher than the second position when the body part is at the unusable position.

2. A flash device which can be mounted on an accessory shoe part of a camera body, comprising:
   (a) a mounting part for mounting said flash device on said accessory shoe part of the camera body;
   (b) a stationary part formed integrally with said mounting part, wherein an operation member of the flash device is arranged at a predetermined location of said stationary part; and
   (c) a body part rotatably connected to said stationary part, said body part having a case part which has a shape extended in a direction approximately vertically upward against said stationary part when the device is in an operating position and has a longer length than a length of said stationary part, as well as a light emitting part which is provided on an upper plane of said case part and is arranged in an approximately parallel direction against said stationary part at a time when the device is in said operating position and further is provided integrally with said case part, said case part being bent down in an approximately parallel direction against said stationary part at a time when the device is not in use so that a light emitting plane of the light emitting part faces to an approximately vertically downward direction against said stationary part, said case part being so placed to cover the operation member of said stationary part when it is at an operating position and being moved to a position not to cover the operation member when it is at a nonoperating position.

* * * * *